Jan. 25, 1927.
B. D. MICKEY
1,615,643
WARD LEONARD DRIVE
Filed July 27, 1925
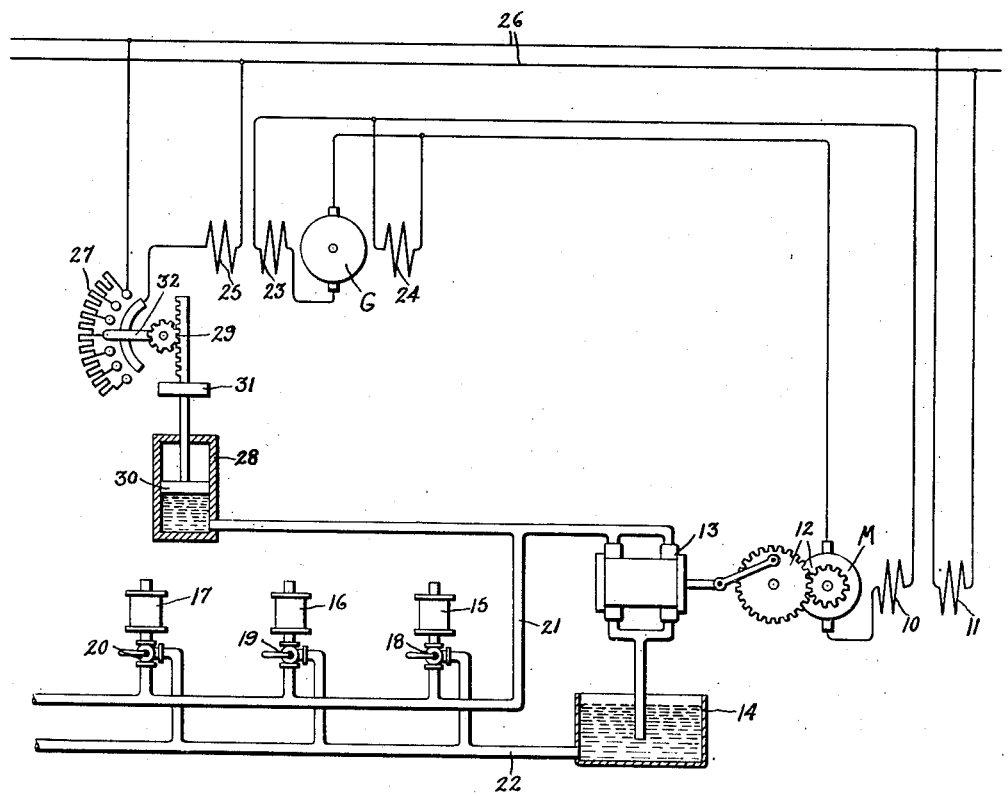
Inventor:
Bruce D. Mickey;
by *Alexander F. Lint*
His Attorney.

Patented Jan. 25, 1927.

1,615,643

UNITED STATES PATENT OFFICE.

BRUCE D. MICKEY, OF SCHENECTADY, NEW YORK, ASSIGNOR TO GENERAL ELECTRIC COMPANY, A CORPORATION OF NEW YORK.

WARD-LEONARD DRIVE.

Application filed July 27, 1925. Serial No. 46,271.

My invention relates to variable speed electric drives, particularly electric drives of the Ward-Leonard type in which the driving motor is operated at varying speed by controlling the voltage of the generator from which the motor is supplied with current and the invention provides an improved drive of the above character in which the motor speed and torque are varied automatically in response to variations in the load on the driving motor.

More specifically the present invention enables a variable load such, for example, as a constant pressure hydraulic pump or the like to be driven by a Ward-Leonard connected motor and generator arranged so that the driving motor operates automatically from standstill to the maximum speed directly in accordance with the variations in the demand on the pump or other apparatus driven thereby.

Thus where the hydraulic reciprocating pump of a constant pressure water system is driven by a Ward-Leonard connected motor and generator arranged in accordance with my invention, the pump delivers an amount of water at substantially constant pressure which depends entirely upon the demand on the pump. When the pump is delivering a given volume of water at the required pressure and the demand for water increases, the speed of the motor driving the pump is automatically increased a corresponding amount in order to maintain the water pressure at the desired value. Similarly upon a decrease in the demand on the pump, the speed of the driving motor automatically is reduced to prevent the water pressure from exceeding the required value. Should the pump outlet be entirely closed, thus reducing the demand on the pump to zero, the pump driving motor is arranged to stall and at the same time exert a torque sufficient to hold the water pressure at the proper value. When the pump outlet is reopened the driving motor starts automatically to operate the pump at the speed required to maintain the water pressure at the desired value.

Control of the pump driving motor is obtained by automatically varying the voltage of the generator so that when the motor is stalled the current supplied to the motor is just sufficient to enable the motor to exert a torque that is equal and opposed to the torque of the constant pressure hydraulic pump load. When the demand on the pump increases the generator voltage is automatically increased sufficiently to enable the motor to run the pump at the speed required to maintain constant pressure in the hydraulic system. In accordance with the preferred form of my invention the generator voltage is controlled by varying the energizing current of a separately excited field winding with which the generator is provided by means of a device which is responsive to the water demand of the hydraulic system.

The invention will be more fully understood from the following description of the accompanying drawing in which the single figure diagrammatically shows a Ward-Leonard hydraulic pump drive embodying a preferred form of the invention.

In the drawing, the electric driving motor M, in the preferred form shown, is of the direct current compound wound type having a series field winding 10 and a separately excited field winding 11, and is connected through suitable mechanical gearing 12 to drive the reciprocating hydraulic pump 13. The pump 13 may be of any type adapted for constant pressure service and draws fluid, such as water or the like, from a reservoir 14 and supplies the fluid under pressure to operate the hydraulic operating rams 15, 16, 17, of riveters, presses or the like under the control of the corresponding operating valves 18, 19, 20. The hydraulic rams 15, 16, 17, may be of any well known type and the controlling valves 18, 19, 20, are of the usual three way type and arranged to establish communication between the operating piston of the respective rams and either the high pressure supply pipe 21, through which fluid is supplied from the pump 13, or the fluid exhaust pipe 22, which drains into the reservoir 14.

The motor M receives its driving current from the generator G which is mechanically driven by suitable means such, for example, as an alternating current synchronous motor, not shown in the drawing. As illustrated, the generator G is provided with a series field winding 23, a self-excited shunt field winding 24, and a separately excited field winding 25 which may be energized from the constant voltage supply lines 26, to which the separately excited field winding 11 of the driving motor M is connected. As will be more fully pointed out hereinafter, the generator shunt field winding 24 and the separately excited field winding 25 are accumulatively wound and the series field winding 23 is wound differentially with respect to the shunt field windings.

In order that the voltage of the generator G may be varied in accordance with the variations in the load imposed upon motor M by variations in the demand on the hydraulic pump 13, a current regulating resistor 27 is connected in the energizing circuit of the separately excited generator field winding 25 and is arranged to be operated by a hydraulic accumulator 28 of relatively small size through the agency of the rack and pinion 29 as shown in the drawing or other suitable mechanical or electrical gearing. The accumulator 28 has its operating piston 30 suitably weighted by the weight 31 so as to maintain a substantially constant pressure in the fluid supply pipe 21 as long as the operating piston 30 is maintained within its limits of travel.

The operation of the hydraulic pump drive illustrated is as follows: Assuming that there is no pressure in the supply line 21 and that the generator G is driven at substantially constant speed by the suitable prime mover connected thereto, the several controlling valves 18, 19, 20, in the respective positions in which they are shown close the outlets from the high pressure pipe 21 and connect the rams 15, 16, 17, to the exhaust pipe 22. Under these conditions the motor separately excited field winding 11 is energized from the constant voltage supply lines 26. The separately excited field winding 25 of the generator likewise is energized at the full voltage of the supply lines 26, since the piston 30 of the accumulator 28 is in its lowest position and the movable contact 32 thereby is operated to short circuit all of the regulating resistor 27.

With full excitation of the separately excited field winding 25, the generator G is designed to build up voltage, thereby energizing the accumulatively wound shunt field winding 24 and also supply driving current to the armature of the motor M. The motor M at once starts to operate the reciprocating pump 13 to draw fluid from the reservoir 14 and build up a pressure in the supply line 21. As the load on the motor M builds up, the compound series winding 10 of motor M serves to prevent operation of the motor at excessive speed and the differential series winding 23 of generator G serves to limit the value of the driving current supplied by the generator G to the motor M to a safe value. Due to the relatively small amount of water required to operate the accumulator 28, the pressure in the supply pipe 21 builds up rapidly upon operation of the pump 13 by the motor M and soon reaches the value at which it is desired to supply operating fluid to the rams 15, 16, 17. When this pressure is reached further operation of the pump 13 by the motor M raises the piston 30 of the accumulator 28.

As the piston 30 of the accumulator rises the contact 32 is operated through the rack and pinion gearing 29 to progressively insert sections of the regulating resistor 27 in the exciting circuit of the generator field winding 25. This results in decreasing the excitation of the generator G, thereby reducing the voltage of the generator. When the contact 32 has been operated to insert a predetermined amount of the resistance 27 in the generator field circuit, the generator voltage is finally reduced to the point where it is just sufficient to supply the motor with a value of current at which the motor torque is substantially equal and opposed to the reactive torque presented by the reciprocating pump 13 when the pressure in the supply pipe 21 is at the desired value. Under these conditions, the pump load stalls the motor, although the latter continues to exert the torque required to maintain the pressure in the supply pipe 21 at the desired value.

If now one or more of the controlling valves 18, 19, 20, is operated, to admit the fluid from the constant pressure supply pipe 21 to the corresponding operating ram, the piston 30 at once falls due to the water or other fluid being withdrawn from the supply pipe 21. As the piston 30 falls, the contact 32 is operated to remove one or more sections of the regulating resistor 27 from the energizing circuit of the generator field winding 25, depending upon the rapidity with which the fluid under pressure in the supply pipe 21 is withdrawn. The excitation of generator G and therefore the generator voltage is immediately increased, thereby starting the motor M into operation to drive the pump 13 at a speed sufficient to replace the fluid withdrawn from the supply pipe 21.

If only one of the controlling valves 18, 19, 20, is operated, the speed at which the motor M drives the pump 13 is relatively low. If all of the controlling valves 18, 19, 20, are simultaneously operated to withdraw fluid from the supply pipe 21, motor M immediately responds to drive the pump 13 at a relatively high speed in order to pump fluid into the supply pipe 21 as fast as it is withdrawn therefrom, thereby maintaining a substantially constant pressure in the supply pipe 21. Thus, it will be seen that in accordance with my invention the voltage of the generator G is varied automatically in response to variations in the load so that the motor M always operates the pump 13 at the speed required to maintain substantially constant pressure in the hydraulic system. In this way, the necessity for a large capacity accumulator in the hydraulic system is effectively eliminated since the accumulator 28 need be only of the size required to successfully operate the contact arm 32 controlling the regulating resistor 27.

In order that the motor torque may be maintained in the desired relation with the opposing substantially constant torque of the reciprocating pump 13, the generator G is required to supply a substantially constant driving current to the motor M irrespective of the speed of the motor.

This is accomplished in the following manner: If the motor current and torque decreases below the value required to maintain a substantially constant pressure in the supply pipe 21, the accumulator 28 operates the contact 32 to increase the excitation of the generator field winding 25, thereby increasing the generator voltage. This causes the motor driving current to be increased to its normal value and the motor speed increases correspondingly. If the motor current and torque exceeds the required value the pressure builds up in the supply pipe 21 and the accumulator 28 operates the contact 32 to slightly decrease the generator voltage and thereby automatically reduce the motor driving current to the normal value. This sequence of operation continues and serves to maintain the motor torque in equilibrium with the reactive torque of the pump.

The resistance 27 preferably is designed so that at the upper position of the accumulator 28 the excitation of the generator due to both the field windings 24 and 25 is reduced slightly below the excitation from the differential field winding 23. Under these conditions the differential field of the generator predominates so as to reduce the driving current of the motor.

The self-excited shunt field 24 of the generator is not essential to the operation of my invention, although it serves to reduce the duty on the separately excited shunt field 25, and hence on the controlling switch 32 and the accumulator 28. It has the further advantage of modifying the voltampere characteristics of the generator so that in case of failure of the accumulator 28 to function, the pressure in supply pipe 21 is automatically maintained within a safe maximum limit somewhat in excess of the normal operating pressure.

If desired, the driving motor M may be of either the series type or the shunt type instead of the compound motor hereinbefore described, the particular type of motor depending upon the characteristics of the particular installation.

When the speed of motor M increases it will be evident that the counter electromotive force generated by the motor correspondingly increases. Thus in order to maintain a substantially constant motor torque at varying speed, the regulating resistor 27 and the generator field winding 25 are so designed that the voltage of generator G is increased substantially in accordance with the increase in the counter electromotive force of motor M. In this way the value of the current supplied to motor M by generator G at the maximum speed is substantially the same as the value of current supplied to the motor M at standstill and the variation in the power input to motor M is obtained entirely by increasing the voltage at which the substantially constant value of driving current is supplied to the motor.

While I have shown and described a preferred embodiment of my invention in a hydraulic pump drive, I would have it understood that the invention is not necessarily limited thereto and may be applied with equal advantage in other service if desired. Furthermore, various modifications in the arrangement shown will readily occur to those skilled in the art which do not depart from the spirit of the invention nor from the scope of the appended claims.

What I claim as new and desire to secure by Letters Patent of the United States is:

1. In a Ward-Leonard drive, the combination of a variable speed direct current motor connected to drive a variable load presenting a substantially constant torque at varying speeds of the motor, a generator for supplying driving current to the motor, and means responsive to variations in the value of the motor load for automatically maintaining the motor driving current substantially constant irrespective of the speed of the motor.

2. In a Ward-Leonard drive, the combination of a variable speed direct current motor arranged to drive a variable load presenting a substantially constant opposing torque at varying speed, a variable voltage generator for supplying driving current to the motor, and means actuated in accordance with variations in the motor load arranged to automatically vary the voltage of the generator to maintain the motor driving torque in a predetermined relation with the load torque.

3. In a Ward-Leonard drive, the combination of a direct current variable speed motor arranged to oppose an active load of substantially constant torque and to drive the same at varying speed, a variable voltage generator for supplying driving current of substantially constant value to the motor, and means responsive to variations in the load on the motor for varying the generator voltage substantially in accordance with variations in the counter voltage of the motor.

4. In a Ward-Leonard hydraulic pump drive, the combination of a pressure pump, a variable speed motor for driving the same to pump varying amounts of fluid at a substantially constant pressure, a variable voltage generator for supplying driving current to the motor, and means responsive to variations in the amount of fluid pumped for automatically controlling the generator voltage and thereby correspondingly varying the operating speed of the driving motor in accordance with variations in demand on the pump.

5. In a Ward-Leonard hydraulic drive, the combination of a pressure pump, a variable speed direct current motor connected to drive the pump, a variable voltage generator connected to supply driving current to the motor, and means operated in accordance with variations in the amount of fluid pumped and arranged to increase the generator voltage when the fluid demand exceeds the fluid pumped and to decrease the generator voltage when the fluid pumped exceeds the fluid demand.

6. In a Ward-Leonard hydraulic drive the combination of a constant pressure reciprocating pump, a direct current variable speed motor connected to drive the pump, a variable voltage generator for supplying driving current to the motor, means for varying the excitation of the generator to thereby vary the voltage at which the driving current is supplied to the motor, and means for actuating said controlling means in accordance with variations in the amount of fluid pumped.

7. In a Ward-Leonard hydraulic drive, the combination of a constant pressure reciprocating pump, a direct current compound wound motor connected to drive the pump, a variable voltage generator having a separately excited field winding and a differential series field winding for supplying driving current to the motor, and means actuated in accordance with variations in the fluid demand for varying the exciting current of said separately excited field winding.

8. In a Ward-Leonard hydraulic drive, the combination of a constant pressure pump, a separately excited direct current motor connected to drive the pump, a variable voltage generator for supplying driving current of substantially constant value to the motor, and means for varying the generator voltage substantially in accordance with variations in the counter voltage of the motor when the pump is driven at differing speeds.

9. In a Ward-Leonard drive, the combination of a constant pressure pump, a separately excited direct current motor for driving the pump at varying speed, a variable voltage generator for supplying driving current to the motor, means for regulating the excitation of the generator to vary the voltage at which current is supplied to the motor, and means responsive to the fluid demand for actuating said excitation controlling means to vary the generator voltage.

In witness whereof, I have hereunto set my hand this 25th day of July, 1925.

BRUCE D. MICKEY.